United States Patent Office

3,268,401
Patented August 23, 1966

3,268,401
TRIARYLBORANE COMPLEX COMPOSITION AND
METHOD FOR SEED PROTECTION
Herman A. Birnbaum, Mendota Heights, and Harvey L.
Anderson, Dellwood, Minn., assignors to Minnesota
Mining and Manufacturing Company, St. Paul, Minn.,
a corporation of Delaware
No Drawing. Filed June 15, 1964, Ser. No. 375,318
16 Claims. (Cl. 167—38)

This is a continuation-in-part of the copending application Serial No. 186,874 filed on April 12, 1962.

This invention relates to the protection of seeds from soil-borne organisms. In one aspect, the invention relates to a process for the protection of seeds from soil-borne organisms. In another aspect, the invention relates to compositions for the treatment of seeds to protect them from soil-borne microorganisms.

Soil-borne organisms which cause decay of crop seeds, damping off of young plants, etc. are responsible for large scale agricultural losses. To prevent or reduce these losses, seeds are frequently treated with various chemicals which are toxic to the organisms. Often, however, levels of treatment sufficient to protect the seeds from the organisms also adversely affect the seeds themselves (i.e. exhibit phytotoxicity). In many cases, a degree of phytotoxicity is tolerated in seed treatments in order to obtain the desired protection against the soil-borne organisms.

Among the most effective seed treating agents are certain triarylborane complexes (see U.S. Patent 3,062,708). It has been found however that these complexes by themselves or mixed with inert diluents, such as diatomaceous earth, clays, etc. are somewhat phytotoxic. It is therefore much to be desired to reduce the phytotoxicity of these complexes without adversely affecting their effectiveness against the soil-borne organisms.

It is therefore an object of this invention to provide a novel process for the protection of seeds.

It is another object of the invention to provide a new and valuable class of seed protectant compositions.

It is another object of the invention to provide seed protectant compositions with little or no phytotoxicity.

It is a further object of the present invention to provide a process for the protection of seeds from soil-borne microorganisms.

It is a still further object of the invention to provide seeds coated with a composition which greatly reduces the effect of soil-borne microorganisms on them.

Other objects will become evident from the disclosure which follows.

In accordance with the above and other objects of the invention, it has been found that seeds of crop plants (such as pea, corn, bean, oat, barley, cucumber, radish, flax, tomato, etc. seeds) can be effectively protected against soil-borne microorganisms and other destructive biological agents present in soils by the application thereto of a relatively small amount of a composition comprising a complex of a triarylborane with a Lewis base having a $pK_b$ less than about 10 in admixture with a finely divided solid compound which buffers to a pH above about 6 in its saturated solution. As used herein the buffer includes not only compounds which resist any change in pH upon addition of acid or alkali but also those which resist a decrease of the pH to below about 6 but do not resist increases in pH. The preferred buffers of the invention buffer to a pH of from about 7.5 to 12.5.

The triarylborane complexes and the buffering agents according to the invention have been found to be highly synergistic with respect to seed protectant activity. The buffering agent alone has no effective activity as a seed protectant while the triarylborane complexes alone are considerably less active against the damping off and seed decay organisms of the soil and have greater negative effects on the seeds themselves than do the compositions of the invention. While the reasons for this synergistic action are not fully understood, it may be that the seed safety is improved by decreasing the actual contact between seed and the complex and the effectiveness of the compositions against the soil-borne microorganisms is due to the chemical stabilization of the active triarylborane complexes by buffering them to a pH range in which they do not readily degrade. Regardless of the mechanism, which has no effect on the invention per se, the compositions of the invention have been found to be highly useful seed protectants.

The compositions of the invention are generally applied to the seeds at a rate of from about 0.03 to 1.0 ounce of the triarylborane complex and from about 0.09 to 10 ounces of the buffering agent per 100 pounds of seed although greater or lesser rates of application will occasionally be desirable, depending upon the particular seeds and field conditions encountered. Ordinarily, but not necessarily, the weight ratio of the triarylborane complex to the buffering agent will be from about 1:3 to 1:10.

The compositions according to the invention are preferably applied to the seeds in solid (dust) formulations although slurry or liquid formulations can be used. The solid formulations can consist entirely of the triarylborane complex-buffering agent composition or additives, such as extending agents, solid wetting agents, stickers, and the like can be added. Thus, hydrated silica, diatomaceous earth, etc. are suitable extending agents. Mixtures of triarylborane complexes and/or mixtures of the buffering agents can also be utilized in particular seed treatment compositions of the invention when desired. "Aerosol" OT–B, primary dioctyl sodium sulfosuccinate; "Renex" 35, polyoxyethylene tridecyl alcohol plus urea; "Triton X–100" isooctylphenyl polyethoxyethanol; "Alkanol B" sodium alkyl naphthalene sulfonate and fatty alcohol sulfates; etc. are suitable solid wetting agents. Low volatility solvents such as glycols, heavy mineral, vegetable or fish oils are suitable stickers; etc. The solid (dust) compositions of the invention can be applied directly by tumbling them with weighed amounts of seed until the latter is uniformly and evenly coated with the desired amount of chemical.

To prepare slurry or liquid seed treatment compositions, the triarylborane complex and the buffering agent can be dissolved, along with a suitable surface active agent and possibly other additives if desired, in a solvent, such as water, dimethylformamide, N-methyl pyrrolidone, acetone, methanol, tetrachloroethylene, methyl chloroform, methylene chloride, chloroform, mineral oil and the like. The slurry or liquid seed treatment composition can then be applied to the seeds using known techniques, e.g. with a conventional slurry treater or by spraying or tumbling onto the seeds.

Broadly speaking, the process for the preparation of the triarylborane complexes comprises preparing an ether solution of the triarylborane and introducing the desired Lewis base. The complexes appear to form in mol-for-mol proportions, and ordinarily, there is immediate precipitation of the ether-insoluble complex. The operation is carried out in the absence of air. Specific directions for the preparation of the complexes of triphenylborane are set forth in Berichte, vol. 57B, p. 813 ff., 1924, while other triarylboranes and their complexes are described in the same Journal, vol. 61B, p. 271, 1928; vol. 63B, p. 934 ff., 1930; and vol. 64B, p. 2112, 1931; and in Annalen, vol. 573, p. 195, 1951.

The triarylborane portions of the complexes are exemplified by triphenylborane, alkyl-substituted triphenylboranes such as tri-p-tolyl borane and tri-p-xylyl borane, halogen-substituted triphenylboranes such as tri-(p-fluorophenyl) borane, alkoxy-substituted triphenylboranes such as triphenetyl borane (i.e. tri-p-ethoxyphenyl borane) and tri-(p-methoxyphenyl) borane, trinaphthyl borane, aryl-substituted triphenylboranes such as tri(p-biphenyl) borane, aryloxy-substituted triphenylboranes such as tri(4-phenoxyphenyl) borane, arylthio-substituted triphenylboranes such as tri(4-phenylthiophenyl) borane and the like. Triphenylborane is preferred in the formation of the complexes used in the invention because it is readily prepared from chlorobenzene and bromobenzene, which are readily accessible, and is highly effective in the process of the invention. A convenient method for the preparation of triphenylborane is the reaction of a metallic derivative of bromobenzene such as phenyl magnesium bromide with boron trifluoride, as described in Berichte, vol. 55B, page 1261 (1922).

The term $pK_b$ is used herein in its conventional meaning, i.e. the negative logarithm of the ionization constant $K_b$. Lewis base complexing agents suitable for use in the preparation of the complexes are, for example, ammonia ($pK_b$ 4.74), methylamine ($pK_b$ 3.19), dodecylamine ($pK_b$ 3.7), n-tetradecyl amine ($pK_b$ 3.8), ethylenediamine ($pK_b$ 4.07), hexamethylene diamine ($pK_b$ ca. 4), tetrahydrofurfuryl aminoethanol ($pK_b$ ca. 5), acetylacetone imide ($pK_b$ ca. 5), benzylamine ($pK_b$ 4.62), triethylenetetramine ($pK_b$ ca. 3), N-alkyl propylene diamines such as 12-(N-dodecyl propylamine) ($pK_b$ ca. 3), dimethylamine ($pK_b$ 3.31), di-n-propylamine ($pK_b$ 3.0), N-methylethanol amine ($pK_b$ ca. 5), piperidine ($pK_b$ 2.79), piperazine ($pK_b$ 4.19), morpholine ($pK_b$ ca. 5), trimethylamine ($pK_b$ 4.13), tri-n-propylamine ($pK_b$ 3.26), 3-dimethylaminopropylamine ($pK_b$ ca. 4), tributylphosphine ($pK_b$ ca. 3), phenyldiethylphosphine ($pK_b$ ca. 4), phenyldipropylphosphine ($pK_b$ 3.4), pyridine ($pK_b$ 8.64), 3-bromopyridine ($pK_b$ 7.82), γ-ethylpyridine ($pK_b$ ca. 8.6), 3-(4-pyridyl)-propanol-1 ($pK_b$ <8.6), 3,5-dichloro-pyridine ($pK_b$ ca. 9), bis(4-pyridyl)glycol ($pK_b$ ca. 8.6), nicotine ($pK_b$ 6.05), isonicotinic acid ($pK_b$ ca.10), n-butyl nicotinate ($pK_b$ ca. 8.7), nicotinamide ($pK_b$ 8.64), isonicotinic thionamide ($pK_b$ ca. 9), β-picoline ($pK_b$ 7.96), γ-picoline ($pK_b$ 7.96), imidazole ($pK_b$ 4.37), metallic bases including alkali and alkaline earth metal hydroxides, such as sodium hydroxide ($pK_b$ <1), potassium hydroxide ($pK_b$ <1), and the like.

The following descriptions, including uncorrected melting points where available, of a number of the complexes will serve to characterize them and are generally illustrative of the complexes useful in the invention.

| | M.P. or appearance |
|---|---|
| Triphenylborane-ammonia | 179–183° C. |
| Triphenylborane-methyl amine | 195–213° C. |
| Triphenylborane-dodecyl amine | Tan grease. |
| Triphenylborane-n-tetradecyl amine | Tan oil. |
| Triphenylborane-triethylenetetramine | 75–84° C. |
| Triphenylborane-duomeen S [1] | Red, viscous oil. |
| Triphenylborane-duomeen 12 [1] | Do. |
| Triphenylborane-duomeen C [1] | Do. |
| Triphenylborane-dimethylamine | 157–166° C. |
| Triphenylborane-piperidine | Ivory wax. |
| Triphenylborane-piperazine | 170–175° C. |
| Triphenylborane-trimethylamine | 132–138° C. |
| Triphenylborane-pyridine | 182–202° C. |
| Triphenylborane-3,5-dichloro-pyridine | 112–115° C. |
| Triphenylborane-bis(4-pyridyl)glycol | 173–181° C. |
| Triphenylborane-γ-picoline | 135–145° C. |
| Triphenylborane-imidazole | 185–190° C. |
| Triphenylborane-sodium hydroxide | White solid, does not melt below 300° C. |
| Tri(α-naphthyl)borane-ammonia | 153–157° C. |
| Tri(α-naphthyl)borane-diethylamine | 170–175° C. |
| Tri(α-naphthyl)borane-trimethylamine | 156–158° C. |
| Tri(p-fluorophenyl)borane-ammonia | 179 181° C. |
| Tri(p-fluorophenyl)borane-triethylamine | 110–115° C. |
| Tri(p-methoxyphenyl)borane-ammonia | 138–142° C. |
| Tri(p-tolyl)borane-ammonia | 143–156° C. |

[1] The Duomeens are products of Armour and Company of Chicago, Illinois. Chemically they are N-alkyl trimethylene diamines. The alkyl group in Duomeen S is derived from soya fatty acid, in Duomeen 12 is derived from $C_{12}$ fatty acid and in Duomeen C is derived from coconut fatty acid.

Among the buffering agents useful for purposes of the invention are the following: barium acetate, barium hydroxide, calcium acetate, calcium hydroxide, calcium sulfate, lithium carbonate, lithium hydroxide, magnesium acetate, magnesium carbonate, magnesium phosphate, magnesium sulfate, nickel acetate, potassium acetate, potassium bicarbonate, potassium carbonate, potassium phosphate, potassium sulfate, sodium acetate, sodium bicarbonate, sodium carbonate, sodium phosphate, strontium acetate, strontium sulfate, zinc acetate, etc.

The following examples illustrate methods and compositions used in practicing this invention, but are not to be construed as limiting the scope thereof in respect of the compositions or complexes to be employed, or the organisms to be subjected to the compositions of the invention. The seed treatments of the invention are evaluated in the examples using Pythium soil and vermiculite greenhouse tests and in field tests. The details of the application of the treatments and of the tests are as follows:

APPLICATION OF THE SEED PROTECTANT COMPOSITIONS

Weighed amounts of the finely divided components of the seed protectants and of the seeds are tumbled together until the seeds are uniformly and evenly coated. In cases where the triarylborane complexes are liquids, they are mixed with and adsorbed by the solid components of the seed treatment before the seeds are added.

PYTHIUM SOIL TEST

This test primarily measures the control of the Pythium organism by the seed treatment. Pythium is responsible annually for important economic losses and its control per se is of great value. This test, in which the treated seeds are subjected to soil which is heavily infested with the microorganism, however, serves as a dependable general screen for the evaluation of the general effectiveness of seed protectant compositions against soil borne microorganisms and other destructive biological agents present in soils (e.g. Rhizoctonia, Pythium, Anthracnose, etc.).

The treated seeds are planted in four-inch plastic pots containing soil heavily infested with Pythium. The pots are held in a refrigerator at 45° F. to 50° F. for a period of four days and are held for the remainder of the tests at approximately 75° F. The moisture level is maintained at about 25 percent of the water holding capacity of the soil. The lower temperature provides optimum conditions for the growth of the fungus organisms and relatively adverse conditions for the germination of the seeds while the higher temperature favors the seed germination. The results of this test are measured as percent emergence (the percentage of the seeds planted which send shoots up through the surface of the soil), average weight in grams per pot of plants resulting from seeds planted in Pythium soil (measured 17 days after planting) and height in inches of the plants (measured 17 days after planting). The average weight and height in inches are measured relative to the portions of the plants above the soil level. Control lots of untreated seeds are generally included.

VERMICULITE TEST

This test measures the effects of seed treatments on the seeds in the absence of the disease factor. Treated and untreated seeds are planted in separate four-inch plastic pots containing vermiculite of relatively small particle size. The treatment and observation of the test pots are the same as in the Pythium soil test.

FIELD TEST

This test is run in mineral soil which is well infested with a generalized population of damping off and seed decay organisms. Six replications of 100 seeds per treatment are planted in randomized row plots 20–22 feet long.

The crops are observed for percentages emergence.

The pH values given relative to the buffering agents are those to which they buffer in their saturated aqueous solutions.

Example 1

In this example the relative effects of the following treatments on Laxtons Progress pea seeds are compared:
(1) Triphenylborane-ammonia complex with buffering agents according to the invention (Lots A–C)
(2) Triphenylborane-ammonia complex with inert diluents (Lots D–E)
(3) Triphenylborane-ammonia complex alone (5% of essentially pure silicon dioxide added to render the chemical physically adaptable to a seed treatment preparation) (Lot F)
(4) Buffering agents alone (Lots G–I)
(5) Inert diluents alone (Lots J–K)
(6) No treatment (Lot L)

In these tests 20 seeds are planted per pot and 5 replicates (pots) are used for each individual treatment. One ounce of seed treatment per bushel of seeds is used in every case.

| Lot | Triphenyl-borane-ammonia complex (percent by weight) | Additive | | Pythium Soil | | Vermiculite | |
|---|---|---|---|---|---|---|---|
| | | Name | Percent by weight | Percent Emergence | Average plant weight per pot | Percent Emergence | Average plant weight per pot |
| A | 25 | Calcium hydroxide | 75 | 95.0 | 7.2 | 96.0 | 6.3 |
| B | 25 | Mangesium carbonate | 75 | 98.7 | 7.3 | 96.0 | 5.3 |
| C | 25 | Ca(OH)$_2$ 50% / MgCO$_3$ 10% / Ca Acetate 10% / Bentonite 5% | 75 | 96.0 | 8.6 | 94.6 | 6.7 |
| D | 25 | Diatomaceous earth | 75 | 92.3 | 5.6 | 90.6 | 3.1 |
| E | 25 | Kaolin | 75 | 93.3 | 5.3 | 90.6 | 3.2 |
| F | 95 | Silicon dioxide | 5 | 90.7 | 4.8 | 92.0 | 3.7 |
| G | 0 | Calcium hydroxide | 100 | 30.8 | 0.9 | 78.6 | 5.8 |
| H | 0 | Magnesium carbonate | 100 | 16.7 | 0.3 | 69.3 | 6.5 |
| I | 0 | Ca(OH)$_2$ 50% / MgCO$_3$ 10% / Ca Acetate 10% / Bentonite 5% | 100 | 38.7 | 0.8 | 85.3 | 6.1 |
| J | 0 | Diatomaceous earth | 100 | 24.0 | 0.6 | 70.7 | 2.9 |
| K | 0 | Kaolin | 100 | 13.7 | 0.2 | 92.0 | 6.1 |
| L | | | | 33.3 | 0.6 | 89.3 | 4.4 |

These test results indicate that the seed protectant compositions of the present invention (Lots A–C) are highly effective against the test organism (Pythium) and have no measurable phytotoxicity. The seed protectant compositions of the triphenylborane complex in admixture with an inert diluent and of the complex in essentially pure form (Lots D–F) exhibit significant phytotoxicity both in the percent emergence and in the average plant weight in both Pythium and vermiculite tests and less effective activity against the test organism. The seed protectant compositions containing none of the triphenylborane complex exhibit little or no advantage over the untreated seeds.

Example 2

In this example the relative effects of various treatments on Laxtons Progress pea seeds are noted. The treatments include (1) various buffering agents alone, (2) the triphenylborane-ammonia complex alone and (3) compositions according to the invention of triphenylborane-ammonia with various buffering agents.

| Seed Treatment Composition | | | | Amount of seed treatment (oz./bu.) | Test Results | |
|---|---|---|---|---|---|---|
| Triphenyl-borane-ammonia complex (percent by weight) | Buffering agent | | Percent by weight | | Percent emergence Pythium soil | Percent emergence vermiculite |
| | Name | pH | | | | |
| 100 | | | 0 | 1.0 | 73 | 41 |
| | | | | 0.5 | 73 | 56 |
| 0 | Potassium Sulfate | ~7 | 100 | 1.0 | 0 | 100 |
| 0 | Barium Acetate | 6–7 | 100 | 1.0 | 0 | 97 |
| 0 | Magnesium Carbonate | >7 | 100 | 1.0 | 0 | 95 |
| 0 | Magnesium Sulfate | ~7 | 100 | 1.0 | 0 | 98 |
| 0 | Calcium Hydroxide | 12.4 | 100 | 1.0 | 0 | 95 |
| 0 | Calcium Acetate | 6.35 | 100 | 1.0 | 0 | 98 |
| 0 | Potassium Carbonate | 11.6 | 100 | 1.0 | 0 | 93 |
| 0 | Potassium Bicarbonate | ~8.5 | 100 | 1.0 | 0 | 97 |
| 0 | Potassium Phosphate | >9 | 100 | 1.0 | 0 | 97 |
| 12.5 | Potassium Bicarbonate | ~8.5 | 87.5 | 1.0 | 83 | 80 |
| | | | | 0.5 | 72 | 76 |
| 12.5 | Potassium Phosphate | >9 | 87.5 | 1.0 | 97 | 73 |
| | | | | 0.5 | 68 | 85 |
| 12.5 | Magnesium Carbonate | >7 | 87.5 | 1.0 | 83 | 98 |
| | | | | 0.5 | 65 | 93 |
| 12.5 | Calcium Hydroxide | 12.4 | 87.5 | 1.0 | 83 | 82 |
| | | | | 0.5 | 72 | 85 |
| 25.0 | do | 12.4 | 75.0 | 1.0 | 85 | 72 |
| | | | | 0.5 | 92 | 87 |
| 12.5 | Calcium Acetate | 6.35 | 87.5 | 1.0 | 86 | 88 |
| | | | | 0.5 | 88 | 85 |

Example 3

In this example Pythium soil tests and vermiculite tests are utilized to compare the growing characteristics of Laxtons Progress pea seeds treated with compositions of the invention consisting of various buffering agents and the triphenylborane-ammonia complex with those of untreated pea seeds of the same type. The seed treatment compositions are 12½ percent triphenylborane-ammonia complex, 75 percent buffering agent and 12½ percent finely divided silica, the latter being added as an aid in compounding the mixture. The rate of seed treatment in all cases is 0.5 ounce per bushel of seeds.

| Buffering Agent | | Test Results | |
|---|---|---|---|
| Name | pH | Percent Emergence Pythium Soil | Percent Emergence Vermiculite |
| Control (Untreated seeds) | | 0 | 91 |
| Potassium Carbonate | 11.6 | 85 | 79 |
| Potassium Bicarbonate | ~8.5 | 79 | 90 |
| Potassium Acetate | ~10 | 57 | 91 |
| Potassium Phosphate | >9 | 80 | 83 |
| Potassium Sulfate | ~7 | 81 | 90 |
| Sodium Carbonate | 11.6 | 75 | 93 |
| Sodium Bicarbonate | >8.5 | 73 | 91 |
| Sodium Acetate | >9.0 | 73 | 90 |
| Sodium Phosphate | >9 | 73 | 85 |
| Barium Hydroxide | >8 | 75 | 88 |
| Barium Acetate | 6–7 | 86 | 90 |
| Magnesium Carbonate | >7 | 82 | 94 |
| Magnesium Acetate | 7.3 | 75 | 86 |
| Magnesium Phosphate | ~7 | 79 | 88 |
| Magnesium Sulfate | ~7 | 82 | 82 |
| Strontium Acetate | ~7 | 60 | 81 |
| Strontium Sulfate | 7.8 | 66 | 93 |
| Lithium Carbonate | 11.6 | 75 | 45 |
| Lithium Hydroxide | >11 | 73 | 90 |
| Calcium Hydroxide | 12.4 | 75 | 93 |
| Calcium Acetate | 6.35 | 80 | 86 |
| Calcium Sulfate | 6.25 | 65 | 85 |

Example 4

The following table presents data from tests run on Laxtons Progress pea seeds treated with a variety of compositions according to the invention, both the triarylborane complex and the buffering agent being varied. The seed protectant compositions of this example all contain 25 percent of the triarylborane complex and 75 percent of the buffering agent.

| Seed Treatment Composition | | | | Amount of seed treatment, oz./bu. | Test Results | | | |
|---|---|---|---|---|---|---|---|---|
| Triarylborane Complex | | Buffering Agent | | | Pythium Soil | | Vermiculite | |
| Name | pK$_b$= of Lewis Base | Name | pH | | Percent Emergence | Plant Ht. in Inches | Percent Emergence | Plant Ht. in Inches |
| Control, none | | | | | 5 | 0.5 | 98 | 1.9 |
| φ$_3$B-Pyridine | 8.64 | Calcium Hydroxide | 12.4 | 1 | 75 | 1.5 | 95 | 1.9 |
| | | do | | ½ | 74 | 1.5 | 93 | 2.0 |
| Do | 8.64 | Magnesium Sulfate | ~7 | 1 | 28 | 1.0 | 93 | 1.7 |
| | | | | ½ | 47 | 1.0 | 98 | 1.7 |
| Do | 8.64 | Magnesium Carbonate | >7 | 1 | 38 | 1.2 | 95 | 1.8 |
| | | | | ½ | 53 | 1.2 | 95 | 1.8 |
| φ$_3$B-Dodecylamine | 3.7 | Calcium Hydroxide | 12.4 | 1 | 94 | 1.5 | 90 | 1.8 |
| | | | | ½ | 92 | 1.5 | 93 | 1.5 |
| Bis-φ$_3$B-Piperazine | 4.19 | do | 12.4 | 1 | 95 | 1.4 | 95 | 1.9 |
| | | | | ½ | 68 | 1.5 | 90 | 1.9 |
| φ$_3$B-NaOH | <1 | Calcium Acetate | 6.35 | 1 | 31 | 0.8 | 90 | 1.6 |
| φ$_3$B-Methyl Ethanolamine | ca. 5 | Calcium Hydroxide | 12.4 | 1 | 87 | 1.4 | 85 | 1.5 |
| | | | | ½ | 95 | 1.5 | 92 | 1.7 |
| Do | ca. 5 | Potassium Bicarbonate | ~8.5 | 1 | 83 | 1.1 | 62 | 1.0 |
| | | | | ½ | 87 | 1.3 | 82 | 1.5 |
| φ$_3$B-Piperidine | 2.79 | Calcium Hydroxide | 12.4 | 1 | 95 | 1.5 | 98 | 1.8 |
| | | | | ½ | 97 | 1.5 | 98 | 1.8 |
| φ$_3$B-Diethylene Triamine | ca. 3 | do | 12.4 | 1 | 93 | 1.5 | 95 | 1.8 |
| | | | | ½ | 95 | 1.5 | 90 | 1.7 |
| Do | ca. 3 | Barium Acetate | 6–7 | 1 | 87 | 1.5 | 85 | 1.5 |
| | | | | ½ | 90 | 1.5 | 96 | 1.7 |
| Do | ca. 3 | Potassium Acetate | 10 | 1 | 87 | 1.2 | 93 | 1.4 |
| | | | | ½ | 92 | 1.2 | 90 | 1.5 |
| φ$_3$B-Trimethylamine | 4.13 | Calcium Hydroxide | 12.4 | 1 | 90 | 1.3 | 98 | 1.6 |
| | | | | ½ | 85 | 1.3 | 85 | 1.8 |
| Do | 4.13 | Potassium Phosphate | 9 | 1 | 89 | 1.3 | 68 | 1.2 |
| | | | | ½ | 89 | 1.3 | 96 | 1.5 |
| φ$_3$B-Ammonia | 4.74 | Calcium Hydroxide | 12.4 | 1 | 92 | 1.3 | 92 | 1.6 |
| | | | | ½ | 89 | 1.3 | 93 | 1.8 |

Similar advantages over untreated seeds are obtained when treating compositions in accord with the invention containing tri(α-naphthyl) borane-ammonia, tri(α-naphthyl) borane-diethylamine, tri(α-naphthyl) borane-trimethylamine, tri(p-fluorophenyl) borane-ammonia, tri(p-fluorophenyl) borane-triethylamine, tri(p-methoxyphenyl) borane-ammonia, tri(p-tolyl) borane-ammonia, tri(p-biphenyl) borane-ammonia, tri(4-phenylthiophenyl) borane-ammonia, tri(4-phenoxyphenyl) borane-ammonia, etc., are used.

Example 5

A number of other compositions according to the invention are evaluated in this example on Laxtons Progress pea seeds.

| Seed Treatment Composition (percent by weight) | Amount of seed treatment (oz./bu.) | Test Results | | | |
|---|---|---|---|---|---|
| | | Pythium Soil | | Vermiculite | |
| | | Percent Emergence | Aver. Plant wt./pot [1] | Percent Emergence | Aver. Plant wt./pot [1] |
| Control, none | | 7 | 0.18 | 85 | 3.28 |
| | | 0 | 0 | 88 | 3.31 |
| | | 0 | 0 | 92 | 3.92 |
| Calcium Hydroxide (75), Magnesium Carbonate (10), Calcium Acetate (10), Bentonite (5) | 1 | 0 | 0 | 92 | 3.54 |
| Do | ½ | 0 | 0 | 98 | 3.67 |
| Do | ¼ | 0 | 0 | 92 | 2.77 |
| φ₃B·trimethylamine (25), Calcium Hydroxide (75) | 1 | 88 | 3.85 | 95 | 5.47 |
| Do | ½ | 95 | 4.68 | 92 | 4.24 |
| Do | ¼ | 88 | 4.08 | 87 | 3.72 |
| φ₃B·ammonia (25), Magnesium Carbonate (75) | 1 | 85 | 3.31 | 98 | 4.76 |
| Do | ½ | 83 | 3.42 | 95 | 4.48 |
| Do | ¼ | 70 | 2.46 | 92 | 3.91 |
| φ₃B·ammonia (10), Calcium Hydroxide (65), Magnesium Carbonate (10), Calcium Acetate (10), Bentonite (5) | 1 | 75 | 2.77 | 97 | 4.44 |
| Do | ½ | 85 | 3.83 | 98 | 3.67 |
| Do | ¼ | 85 | 5.53 | 92 | 3.74 |
| φ₃B·ammonia (15), Calcium Hydroxide (60), Magnesium Carbonate (10), Calcium Acetate (10), Bentonite (5) | 1 | 85 | 3.43 | 97 | 4.60 |
| Do | ½ | 92 | 4.88 | 93 | 2.77 |
| Do | ¼ | 92 | 5.00 | 97 | 3.57 |
| φ₃B·ammonia (20), Calcium Hydroxide (55), Magnesium Carbonate (10), Calcium Acetate (10), Bentonite (5) | 1 | 88 | 3.22 | 95 | 3.33 |
| Do | ½ | 97 | 6.52 | 98 | 3.23 |
| Do | ¼ | 97 | 7.19 | 97 | 3.89 |
| φ₃B·ammonia (25), Calcium Hydroxide (50), Magnesium Carbonate (10), Calcium Acetate (10), Bentonite (5) | 1 | 90 | 4.48 | 98 | 3.59 |
| Do | ½ | 92 | 5.12 | 98 | 3.17 |
| Do | ¼ | 100 | 5.87 | 97 | 3.31 |

[1] There are three plants per pot. The value reported is the total weight in grams of the tops (i.e. the portion above the soil or vermiculite level) of all three plants.

Example 6

The following tests are on Golden Cross Bantam sweet corn seeds.

| Seed Treatment Composition | | | | Amount of seed treatment (oz./bu.) | Test Results | |
|---|---|---|---|---|---|---|
| Triphenylborane ammonia complex (percent by weight) | Buffering Agent | | | | Percent emergence pythium soil | Percent emergence vermiculite |
| | Name | pH | Percent by weight | | | |
| Control, none | Control, none | | | | 8 | 96 |
| 12.5 | Barium acetate | 6–7 | 87.5 | 1 | 92 | 82 |
| | | | | ½ | 92 | 90 |
| | | | | ¼ | 66 | 93 |
| 12.5 | Potassium Carbonate | 11.6 | 87.5 | 1 | 83 | 72 |
| | | | | ½ | 93 | 72 |
| | | | | ¼ | 90 | 72 |
| 12.5 | Magnesium Carbonate | >7 | 87.5 | 1 | 82 | 95 |
| | | | | ½ | 92 | 92 |
| | | | | ¼ | 92 | 95 |
| 12.5 | Magnesium Sulfate | ~7 | 87.5 | 1 | 83 | 80 |
| | | | | ½ | 82 | 93 |
| | | | | ¼ | 68 | 93 |
| 12.5 | Potassium Sulfate | ~7 | 87.5 | 1 | 90 | 65 |
| | | | | ½ | 88 | 88 |
| | | | | ¼ | 70 | 95 |
| 12.5 | Calcium Acetate | 6.4 | 87.5 | 1 | 90 | 88 |
| | | | | ½ | 95 | 90 |
| | | | | ¼ | 87 | 87 |
| 12.5 | Potassium Phosphate | >9 | 87.5 | 1 | 93 | 86 |
| | | | | ½ | 95 | 88 |
| | | | | ¼ | 42 | 88 |
| 12.5 | Potassium Bicarbonate | ~8.5 | 87.5 | 1 | 92 | 85 |
| | | | | ½ | 92 | 83 |
| | | | | ¼ | 92 | 92 |
| 12.5 | Calcium Hydroxide | 12.4 | 87.5 | 1 | 93 | 92 |
| | | | | ½ | 95 | 82 |
| | | | | ¼ | 95 | 73 |
| 25 | do | 12.4 | 75 | 1 | 89 | 70 |
| | | | | ½ | 90 | 93 |
| | | | | ¼ | 89 | 72 |
| 50 | do | 12.4 | 50 | 1 | 87 | 80 |
| | | | | ½ | 95 | 72 |
| | | | | ¼ | 88 | 93 |

Example 7

The following are field tests which demonstrate the value of the compositions of the invention on various crops under normal conditions of use.

| Seed | Seed treatment composition | Dosage (oz./100 lb. of seed) | Test results (percent emergence) |
|---|---|---|---|
| Corn (Golden Cross Bantam sweet corn) | None, control | | 66.8 |
| Do | 25% $\phi_3$B-ammonia, 75% calcium hydroxide | 1 | 77.3 |
| Cucumber (SMR-12) pickling cucumber | None, control | | 29.0 |
| Do | 25% $\phi_3$B-ammonia, 75% calcium hydroxide | 2 | 50.5 |
| Do | 25% $\phi_3$B-ammonia, 37½% calcium hydroxide, 37½% magnesium carbonate | 6 | 56.2 |
| Cotton (Machine delinted Stoneville No. 7) | None, control | | 24.0 |
| Do | 25% $\phi_3$B-ammonia, 75% calcium hydroxide | 1½ | 31.7 |
| Do | do | 3 | 35.2 |
| Do | 25% $\phi_3$B-ammonia, 37½% calcium hydroxide, 37½% magnesium carbonate | 3 | 36.5 |
| Peas (Alderman) | None, control | | 64.6 |
| Do | 25% $\phi_3$B-ammonia, 75% calcium hydroxide | 1 | 76.7 |
| Do | do | 2 | 88.8 |
| Sorghum (RS 610) | None, control | | 31 |
| Do | 25% $\phi_3$B-ammonia, 75% calcium hydroxide | ½ | 36 |
| Do | do | 1 | 42 |
| Do | 25% $\phi_3$B-ammonia, 37½% calcium hydroxide, 37½% magnesium carbonate | ½ | 40 |
| Sorghum (Midland) | None, control | | 22 |
| Do | 25% $\phi_3$B-ammonia, 75% calcium hydroxide | ½ | 32 |
| Do | 25% $\phi_3$B-ammonia, 37½% calcium hydroxide, 37½% magnesium carbonate | ½ | 31 |

What is claimed is:

1. The method of protecting seeds from soil dwelling organisms which comprises applying to said seeds before planting a composition comprising a complex of a triarylborane selected from the class consisting of triphenylborane, alkyl-substituted triphenylborane, halogen-substituted triphenylborane, alkoxy-substituted triphenylborane, trinaphthyl borane, tri-(p-biphenyl) borane, tri-(4-phenoxyphenyl) borane and tri-(4-phenylthiophenyl) borane with a Lewis base having a $pK_b$ less than about 10 intimately intermixed with a finely divided solid compound which buffers to pH above about 6 in its saturated aqueous solution.

2. A method according to claim 1 wherein the Lewis base is pyridine.

3. A method according to claim 1 wherein the Lewis base is dodecylamine.

4. A method according to claim 1 wherein the Lewis base is piperizine.

5. A method according to claim 1 wherein the Lewis base is methylethanolamine.

6. A method according to claim 1 wherein the Lewis base is piperidine.

7. A method according to claim 1 wherein the Lewis base is diethylenetriamine.

8. A method according to claim 1 wherein the Lewis base is trimethylamine.

9. A method according to claim 1 wherein the finely divided solid compound is magnesium carbonate.

10. The method of protecting seeds from soil dwelling organisms which comprises applying to said seeds before planting a composition comprising a complex of triphenylborane with a Lewis base having a $pK_b$ less than about 10 intimately intermixed with a finely divided solid compound which buffers to a pH above about 6 in its saturated aqueous solution.

11. The method according to claim 10 wherein said Lewis base is ammonia.

12. A method according to claim 1 wherein the finely divided compound buffers to a pH of from about 7.5 to 12.5.

13. A composition comprising a complex of a triarylborane selected from the class consisting of triphenylborane, alkyl-substituted triphenylborane, halogen-substituted triphenylborane, alkoxy-substituted triphenylborane, trinaphthyl borane, tri (p-biphenyl) borane, tri-(4-phenoxyphenyl) borane and tri-(4-phenylthiophenyl) borane with a Lewis base having a $pK_b$ less than about 10 intimately intermixed with a finely divided solid compound which buffers to a pH above about 6 in its saturated aqueous solution.

14. A composition comprising a complex of triphenylborane with a Lewis base having a $pK_b$ less than about 10 intimately intermixed with a finely divided solid compound which buffers to a pH above about 6 in its saturated aqueous solution.

15. A composition comprising a complex of a triarylborane selected from the class consisting of triphenylborane, alkyl-substituted triphenylborane, halogen-substituted triphenylborane, alkoxy-substituted triphenylborane, trinaphthylborane, tri-(p-biphenyl) borane, tri-(4-phenoxyphenyl) borane and tri-(4-phenylthiophenyl) borane with ammonia intimately intermixed with a finely divided solid compound which buffers to a pH above about 6 in its saturated aqueous solution.

16. A composition comprising a complex of a triarylborane selected from the class consisting of triphenylborane, alkyl-substituted triphenylborane, halogen-substituted triphenylborane, alkoxy-substituted triphenylborane, trinaphthylborane, tri-(p-biphenyl) borane, tri-(4-phenoxyphenyl) borane and tri-(4-phenylthiophenyl) borane with a Lewis base having a $pK_b$ less than about 10 intimately intermixed with finely divided solid calcium hydroxide.

References Cited by the Examiner

UNITED STATES PATENTS 3,062,708   11/1962   Updegraff _____ 167—30
3,140,977   7/1964   Duyfjes et al. _____ 167—30

JULIAN S. LEVITT, *Primary Examiner.*

GEORGE A. MENTIS, *Assistant Examiner.*